A. MELIN.
ANIMAL TRAP.
APPLICATION FILED OCT. 3, 1914.
1,145,254.
Patented July 6, 1915.
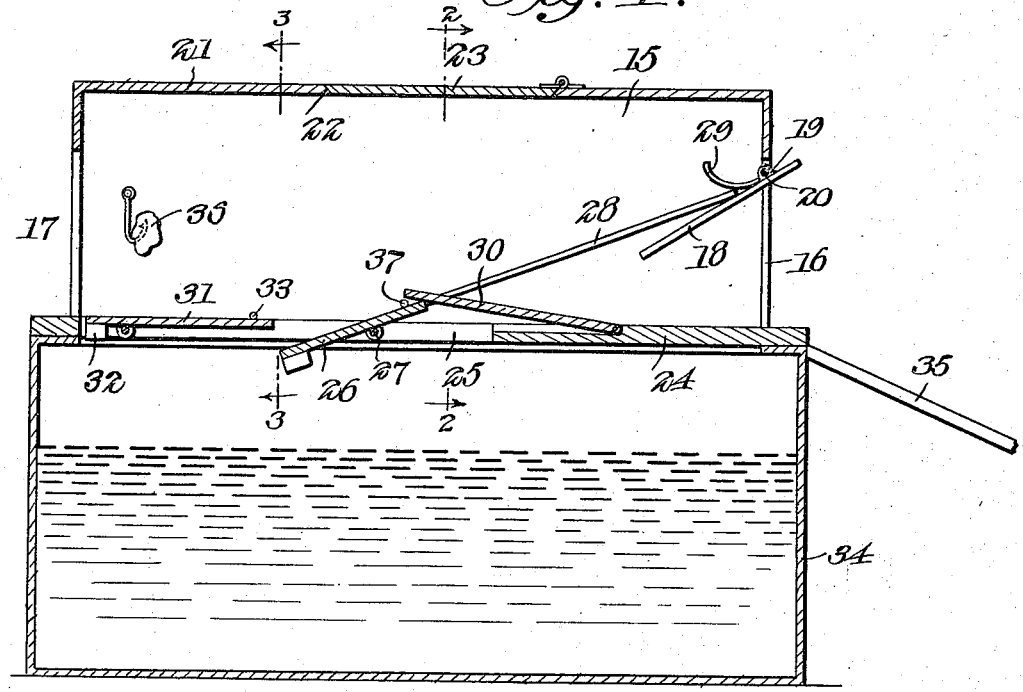
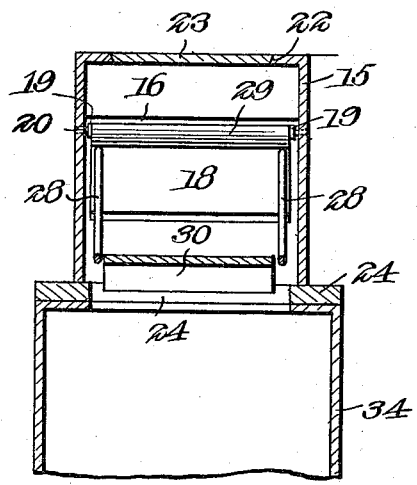
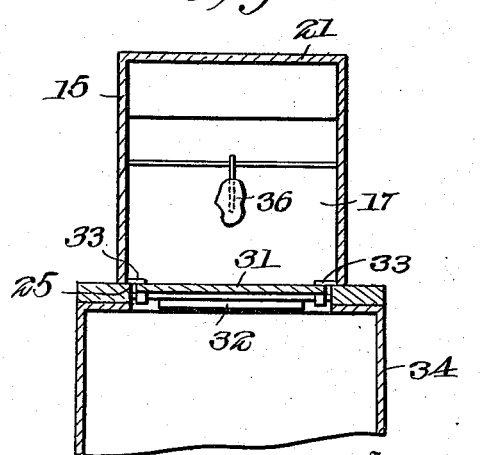
Witnesses
Hugh H. Ott
Wm. Dagger
Inventor
August Melin
By Victor J. Evans
Attorney

UNITED STATES PATENT OFFICE.

AUGUST MELIN, OF ENUMCLAW, WASHINGTON, ASSIGNOR OF ONE-HALF TO IRVEN OSBORNE AND DAVE FORLER, OF ENUMCLAW, WASHINGTON.

ANIMAL-TRAP.

1,145,254. Specification of Letters Patent. Patented July 6, 1915.

Application filed October 3, 1914. Serial No. 864,839.

*To all whom it may concern:*

Be it known that I, AUGUST MELIN, a citizen of the United States, residing at Enumclaw, in the county of King and State of Washington, have invented new and useful Improvements in Animal-Traps, of which the following is a specification.

This invention relates to animal traps of the type which is known as victim set, and it has for its object to simplify and improve the construction of the same.

A further object of the invention is to produce an animal trap of the type referred to embodying simple and efficient mechanism whereby the trap entrance is closed by the weight of the animal entering the trap, the trap being provided with an apparent exit, the path of which, however, leads over a trap door which is operated by the weight of the animal which will thus inevitably be entrapped, the entrance to the trap being automatically reset as soon as the animal drops through the trap door.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing, Figure 1 is a longitudinal vertical sectional view of a trap constructed in accordance with the invention. Fig. 2 is a transverse sectional view taken on the line 2—2 in Fig. 1. Fig. 3 is a transverse sectional view taken on the line 3—3 in Fig. 1.

Corresponding parts in the several figures are denoted by like characters of reference.

The trap box 15 is of rectangular shape and of elongated form, its length being considerably in excess of its width and height. The two ends of the box are provided with openings 16, 17, and adjacent to the opening 16 which constitutes the entrance is pivotally supported a door 18, said door being provided intermediate its upper and lower ends with ears or lugs 19 for the passage of a pivot rod or pintle 20. The trap box has a top member 21 provided with an opening 22 which is usually obstructed by a hinged lid 23. The bottom member 24 of the trap box has an opening 25 which extends from a point intermediate the ends of the box to that end of the box having the opening 17. The opening 25 is partly obstructed by a door or plate 26 which is supported pivotally on a transverse rod 27, said plate normally occupying a slightly tilted or inclined position, when the trap is set. The door or plate 26 has an arm 28 extending forwardly in the direction of the door 18 and adapted to contact with the rear or inner face of said door, the latter being provided on the rear face thereof with an inclined or arcuate hood 29 beneath which the arm 28 extends. The arm 28 is located adjacent to one side wall of the trap box, and if desired a mate or duplicate of said arm may be arranged at the opposite side, as shown in Fig. 2. It will be seen that by moving the forward end of the plate 27 in a downward direction, the forward end of the arm 28 will bear downwardly on the inner face of the door 18, thus closing the latter. By reversing the movement of the plate 26, the arm 28 will bear upwardly against the hood 29, and the door 18 will swing open. It will be advisable to so proportion the door or plate 26 or to weight the same at its rearward end so that it will automatically serve to maintain the front door 18 in an open condition. A trigger plate 30 is pivoted on the floor member 24 of the trap, the free rearward edge of said trigger plate being normally supported on the elevated forward edge of the plate 26 so that by imposing a weight on the trigger plate, the plate 26 will swing about its pivotal axis with the result of moving the door 18 to a closed or obstructing position.

Supported pivotally adjacent to the opening 17 at the rear end of the trap box, and in the plane of the floor member 24 is a trap door 31, the rearward end of which may carry a weight 32 whereby the trap door will be normally maintained in an approximately horizontal position; pins or similar obstructions 33 being provided to prevent the forward end of the trap door from swinging upwardly beyond the predetermined point. The forward edge of the trap door 31 is clear of the rearward edge of the door or plate 26 so that one of said members will not interfere with the operation of the other.

In operation, the improved trap may be placed on a receptacle 34 of suitable dimensions to receive a number of victims, and said receptacle may be partly filled with water, as indicated in the drawing.

It is obvious that in the construction of the improved trap, care will be taken that the moving parts thereof shall be properly balanced, so that the operation in entrapping a victim, as well as in resetting the trap, will take place automatically and unfailingly. Stops, as 37, may be provided in the path of the pivoted plate 26 to prevent its tilting out of engagement with the trigger plate 30. It is also obvious that an inclined approach 35 may be provided adjacent to the front end of the trap.

In operation, the victim entering through the opening 16 beneath the pivoted door 18 for the purpose of reaching the bait or lure which may be impaled, suspended or otherwise supported near the front end of the trap, as shown at 36, will step on the trigger plate 30, thereby depressing the forward end of the plate 26 and closing the door 18. The victim, perceiving the unobstructed opening 17 will run in the direction thereof, but will step on the rearward end of the plate 26 and on the forward end of the trap door 31, both of which yield downwardly, precipitating the victim into the receptacle below. The parts being freed of the weight of the victim will immediately return to the initial or set position.

Having thus described the invention, what is claimed as new, is:—

1. A trap box having alining openings at its front and rear ends, said box including a bottom member having an opening extending from a point intermediate the ends to the rear end of the box, a pivoted door adjacent to the front opening, said door having a hood on the inner face thereof, a pivotally supported plate partly obstructing the bottom opening near the front end of the latter, said plate having an arm extending beneath the hood of the front door, said plate being weighted to maintain the front door normally open, and a trigger door pivoted adjacent to the bottom of the trap and having its free rearward edge supported on the uptilted forward edge of the pivoted plate.

2. A trap box having alining openings at its front and rear ends, said box including a bottom member having an opening extending from a point intermediate the ends to the rear end of the box, a pivoted door adjacent to the front opening, said door having a hood on the inner face thereof, a pivotally supported plate partly obstructing the bottom opening near the front end of the latter, said plate having an arm extending beneath the hood of the front door, said plate being weighted to maintain the front door normally open, and a trigger door pivoted adjacent to the bottom of the trap and having its free rearward edge supported on the uptilted forward edge of the pivoted plate; in combination with a gravity trap door normally obstructing the rearward part of the opening in the bottom of the trap adjacent to the unobstructed rearward opening of the trap box.

In testimony whereof I affix my signature in presence of two witnesses.

AUGUST MELIN.

Witnesses:
F. G. ULMAN,
W. E. HEIDINGER.

Copies of this patent may be obtained for five cents each, by addressing the "Commissioner of Patents, Washington, D. C."